Figure 1:
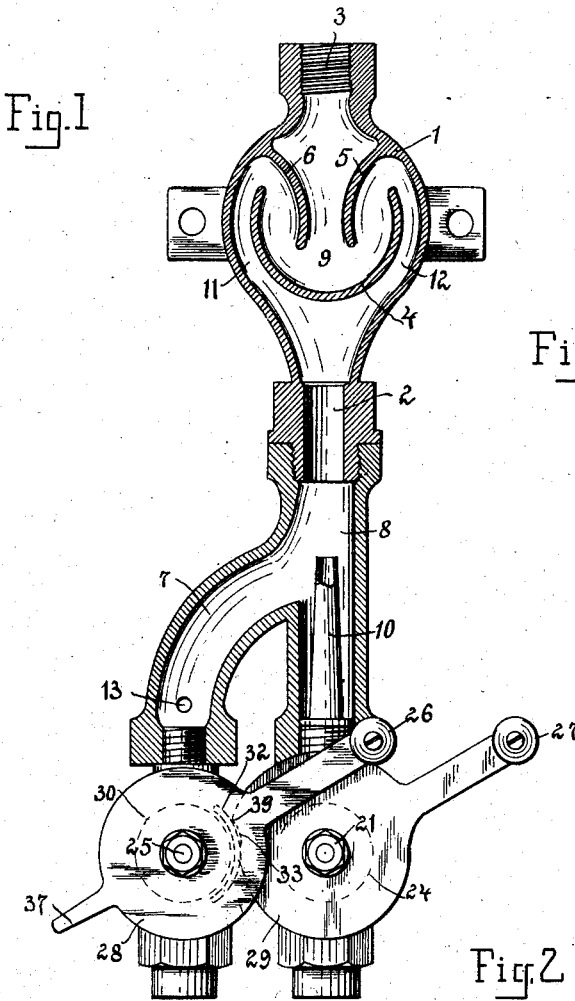

No. 866,122. PATENTED SEPT. 17, 1907.
J. FOSTER.
WATER HEATER.
APPLICATION FILED JUNE 14, 1906.

WITNESSES
S. Herzog
V. N. Hopping

INVENTOR
Joseph Foster
BY
Faust F. Crampton
ATTORNEY

THE NORRIS PETERS CO., WASHINGTON, D. C.

UNITED STATES PATENT OFFICE.

JOSEPH FOSTER, OF NEW YORK, N. Y.

WATER-HEATER.

No. 866,122.  Specification of Letters Patent.  Patented Sept. 17, 1907.

Application filed June 14, 1906. Serial No. 321,600.

*To all whom it may concern:*

Be it known that I, JOSEPH FOSTER, a citizen of the United States, and a resident of the borough of Brooklyn, city of New York, State of New York, have invented new and useful Improvements in Water-Heaters, of which the following is a specification.

This invention relates to a means for uniformly heating water for any purpose and it particularly relates to interlocking valves for regulating the flow of a stream of cold water and the flow of steam or of hot water.

The invention has for its object to provide a means whereby the stream of cold water may be heated by steam or by hot water and whereby every portion of the cold water will be uniformly heated throughout.
The invention to this end particularly relates to showers and any other purposes wherein water is to be heated.

The invention consists in other features set forth in the following description, shown in the drawing and claimed in the claims.

Figure 3:
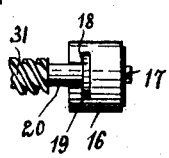
Figure 2:
Figure 4:
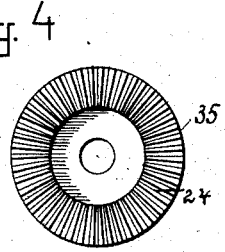

In the drawings Figure 1 is a sectional view of the heating device. Fig. 2 is a side view of the valve mechanism. Fig. 3 is a view of the valve plug. Fig. 4 is a view of a part of the adjusting mechanism.
In the drawing 1 is a mixing chamber and 2 and 3 are inlets and outlets thereto. The mixing chamber has a curved deflecting wall 4 which is substantially circular which has an opening at the top. The mixing chamber also has two deflecting walls 5 and 6 which extend to the interior 9 of the circular wall 4. The circular wall 4 causes the stream coming through the inlet 2 to divide and pass along the channels formed on either side until the divided stream reaches the ends of the wall 4. The walls 5 and 6 then direct the said streams to the interior 9 of the circular wall where they strike each other and thoroughly commingle. From thence the water passes out between the walls 5 and 6 to the outlet 3. The mixing chamber is connected to the valve chambers; one connection leading from the cold water valve to the mixing chamber and the other connection leading from the hot water or steam valve to the mixing chamber. An injector 8 is inserted in the connection leading from the hot water or steam valve to the mixing chamber. The cold water will pass through the connection 7 to a point in front of the injector and will be injected together with the steam or hot water or both into the mixing chamber. The steam passing from the injector 10 is directed to the center of the lower end of the mixing chamber 1 and generally in the center of the cold stream of water as the said cold stream of water enters the mixing chamber 1. The steam or the hot water and the cold water strike the lower side of the circular deflecting wall 4 and pass along opposite sides of the circular wall through the channels 11 and 12 and to the top of the deflecting wall and then is directed inward by the walls and is deflected to the interior 9 of the mixing chamber and to the sides of the wall 4 by the outwardly curved surfaces of the walls 5 and 6. There the two streams meet in substantially opposite directions and the water further commingles and rises between the walls to the upper portion of the mixing chamber and passes through the outlet 3 into a shower or faucet or to any other device or system wherein heated water may be used.
When the valves are closed the water then remaining in the mixing chamber may be allowed to drip off through the opening 13 and the tube 14 leading therefrom.

The valve arrangement consists of the valve plug 16 having a disk or washer 15 mounted thereon which is adapted to be pressed against the valve seat. The disk 15 which is part of the valve plug may be made of any suitable substance such as hard rubber. It is supported in the plug or casing 16 and is attached thereto by means of the bolt and nut 17. It is adapted to be forced against the valve seat to cut off the admission of water to the mixing chamber. The plug or casing 16 is provided with a slot 18 adapted to receive the head 19 and the neck 20 which forms a part of the valve stem 21. The head 19 is circular and can be turned within the casing 16 as the valve stem 21 is turned. The slot 18 is so made that the neck 20 and the head 19 can be easily removed from the casing 16. If it is desired the casing can be easily removed and the disk of hard rubber can be replaced by another. A portion of the stem 21 is threaded. The stem and plug are supported in the valve casing 22 which is attached to the walls of the valve chamber 23. The threaded portion of the valve stem is provided with threads of such a character that when the stem is turned a short distance, it will open the valve in full. Three or four or more threads may be located on the valve stem.

The stems 21 and 25 of the valves are operated by means of the handles 26 and 27 which are attached to the disks 28 and 29. The stem 25 of the cold water valve is operated by the handle 26 which is attached to the disk 28. The stem 21 for the steam or hot water valve is operated by the handle 27. The disks 28 and 29 are adapted to operate on the disks 24 and 30 to turn the stems of the two valves. The disks 28 and 29 are each provided with radiating teeth located on the sides thereof which are adapted to mesh with similar radiating teeth located on the sides of the disks 24 and 30 which are attached to the stems of the valves so that when the handles are turned the stems are turned.

In order to avoid the danger of permitting steam or water that is too hot to pass through the mixing chamber and out through the shower or through a faucet or into any system in which the heated water is to be used, an interlocking mechanism is provided whereby the steam or hot water valve can not be opened unless the cold water valve has first been opened to a greater or lesser extent. A circular flange 32 which describes an arc of about ninety degrees is located on the disk 28 of the cold water valve and is adapted to register with an inwardly curved portion 33 of the disk 29. When the cold water valve is closed the flange 32 is located in the said curved portion 33 of the edge of the disk. When in this position if it is attempted to open the hot water valve, the outer edge of the disk and the end 39 of the curved portion 33 will strike against the flange 32 of the disk 28. This will prevent the handle of the hot water valve from being turned and the valve from being opened until the cold water valve is opened a substantial amount by reason of the length of the flange 32. When the cold water valve is opened, that is, when the handle 26 is turned to the left so that the flange will clear the curved portion of the disk of the steam or hot water valve, the handle 27 of the hot water valve may then be thrown to the left and the hot water valve may be opened. When the water is to be closed off, if it is attempted to close the cold water valve, the end of the flange 32 of the cold water valve will strike the edge of the disk of the hot water valve and the cold water valve can not be further closed. This necessitates that the hot water or the steam valve shall be closed first. When the hot water is closed by throwing the handle to the right, that is, to its normal position the curved portion of the disk of the steam or hot water valve is normally in position so that the flange of the hot water valve will register therewith, the cold water valve may then be closed; the said flange will then pass into the curved portion of the hot water valve disk.
If the valve plugs or disks 15 which press against the valve seat 34 wear in the use thereof the casing and the stems will have to pass into the valve chambers further than they did before the said disks or plugs are worn. This requires that the handles or disks 28 or 29 shall be turned further to the right in order to close the valves. This will bring the curved portion of the disk 29 further to the right so that the flange can not accurately register with the curved portion of the disk of the steam or hot water valve. When the plug of the steam or hot water valve is slightly worn the handle operating the valve must be turned further to the right in order to tightly close the valve unless the handle is readjusted. Before re-adjustment of the handle and when the valve is closed it will prevent the closing of the cold water valve more than substantially half of the amount of the opening of the valve by reason of the length of the flange 32 and its position relative to the handle 26, the same as in the case where the hot water valve is open and it is attempted to close the hot water valve before the cold water valve is closed. This immediately reveals the fact that the plug is worn and shows the necessity of adjustment. The natural movement of the operator when it is desired to close the valves, is to swing the handles until they come to a stop. If handle 26 is operated first, it is brought to a stop on about half opening the valve provided the hot water valve is opened. If then the handle 27 of the hot water valve is operated it will be swung over until it is brought to a stop by reason of the plug being brought against its seat. If the handle 27 is properly adjusted with respect to the lower surface of the valve plug, that is, the surface that strikes the seat, the handle 26 can then be swung to the right to close the cold water valve. If there is any play in the handle 27 or in the plug connected thereto, when the handle 26 is in a closed position, steam will escape and pass into the shower to the great injury of the operator. In my invention, however, the recision or reverse curve 33 on the disk of the hot water valve which exactly registers with the projecting portion 32 on the disk of the cold water valve prevents this injurious result. If there is any wear in the plug of the steam valve, the cold water valve can not be closed and hence the water coming through the shower can not be stopped until the disk and handle of the hot water valve is re-adjusted to change the position of the reverse curve 33. In my invention I have, however, provided a means whereby the disk of the hot water valve may be adjusted with respect to the stem of the valve so as to bring the curved portion when the valve is closed into a position that it will register whatever may be the thickness of the disk 15. The same is true in connection with the cold water valve. If the disk 15 wears, it will be necessary to turn the handle 26 and valve stem further to the right to close the valve than was required before the disk was worn so that the flange will not register with the curved portion of the disk of the hot water valve in such a case. I have provided adjustable interlocking means which perfectly locks the valves and adjusts the interlocking means to any thickness that the valve plug may have or wear and prevents closing or opening of the valves unless one of them is completely closed or open and prevents closing of one of the valves when the plug wears unless the said interlocking means is re-adjusted.

The adjusting mechanism consists of a disk 24 which is attached to the stem 21. The disk 24 is provided with radiating teeth 35. The disk 29 is also provided with radiating teeth 36. The radiating teeth of the two disks are adapted to intermesh with each other and the two disks may be locked together by means of a nut so that the handle and the disk 29 may be located in any position relative to the disk 24 and firmly secured in such a position. A similar arrangement is made for the cold water valve. The disks of the valves are placed upon the stems and are locked into their positions with respect to each other and so that the flange will register with the curved portion of the disk of the hot water valve as described above whereby the disks are locked to the valve stems and whereby the interlocking mechanism may be adjusted with respect to each other notwithstanding any wear that may occur by reason of the use of the valves.

In order to prevent the cold water valve from being turned too far a means may be provided for limiting the motion of the same. I have shown a means for that purpose which consists of a lug or arm 37 which protrudes from the disk 28 and is adapted to strike the nut on the hot water valve stem. The hot water or steam valve is also limited in its movements. This is accomplished by the handle striking the stem of the cold water valve when it is turned to the left.

The invention may be modified by those skilled in the art without departing from the spirit thereof. The interlocking mechanism may be used in connection with valves used for any purpose whatsoever and the details thereof may be varied.

What I claim as new and desire to secure by Letters Patent is as follows:—

1. In a system the combination of two valves, an adjustable closing means located on each of the said valves, a locking means connected with one of the said closing means and adjustable therewith adapted to lock the other of the said closing means in a normal closed position, a locking means connected to the said other of the closing means and adjustable therewith adapted to lock the first named closing means open when the said other closing means is in an open position and when beyond a normal closed position.

2. In a system the combination of a pair of valves, a valve plug and a valve seat located in each of said valves, disks connected to the said valves, handles connected to disks which are adapted to adjustably engage with the first named disks, one of the second named disks having a reversed curve, the other of the second named disks having a curved flange adapted to register with the said reversed curve.

3. In a system the combination of a pair of valves, a valve seat and a valve plug located in each of said valves, handles connected to the said valves, a cam connected to one of the said handles and having a reversed curved portion, a curved flange connected to the other of said handles and adapted to register with the said curved portion of the first named handle.

4. In a system the combination of a pair of valves, a valve seat and a valve plug located in each of the said valves, means for closing one of the said valves, the said means having a reverse curved portion and a means for closing the other of the said valves and having a flange forming an arc of substantially ninety degrees and adapted to register with the said curved portion.

5. In a system the combination of a pair of valves, a valve seat and a valve plug located in each of the said valves, handles connected to the said valves, a cam connected to one of the said handles and having a reversed curved portion, a curved flange connected to the other of said handles, and adapted to register with the said curved portion and to prevent the closing of the valve connected to the handle having the said flange more than a predetermined amount when the other of the said handles is in other than a normal closed position.

6. In a system the combination of a pair of valves, a valve seat and a valve plug located in each of the said valves, handles connected to each of the said valves, means for adjusting the said handles, a cam connected to one of said handles and having a reversed curved portion, a curved flange connected to the other of the said handles and adapted to register with the said curved portion and to prevent the closing of the first named valve when the other of the said valves is closed if one of the handles is not accurately adjusted with respect to the thickness of the valve plug to bring the same on the valve seat.

7. In a system the combination of a plurality of valves, each valve consisting of a valve chamber, a valve seat and a valve plug located in the said chamber, stems connected to the said valve plugs, a disk having radiating teeth connected to each of the said stems, handles adjustably connected to the said disks; a part connected to one of the said handles having a curved portion, a flange connected to another of the said handles, the said flange adapted to register with the said curved portion.

8. In a system the combination of two valves, a closing means located on each of said valves, one of said closing means located in a normal position when the valve connected therewith is closed, a means for positively locking one of said closing means in an open position when the other of said closing means is moved beyond the said closed position.

9. In a system the combination of two valves, a closing means located on each of said valves, one of said closing means located in a normal closed position when the valve connected therewith is closed, a means for positively locking one of said closing means in an open position when the other of the said closing means is moved beyond the said closed position to close one of the said valves and means for adjusting both of said closing means.

In testimony whereof, I have signed my name to this specification, in the presence of two subscribing witnesses.

JOSEPH FOSTER.

Witnesses:
FAUST F. CRAMPTON,
V. N. HOPPING.